(12) United States Patent
Kanamori et al.

(10) Patent No.: US 7,242,169 B2
(45) Date of Patent: Jul. 10, 2007

(54) METHOD AND APPARATUS FOR VOLTAGE COMPENSATION FOR PARASITIC IMPEDANCE

(75) Inventors: Takashi Kanamori, San Jose, CA (US); Stephen J. Kim, San Jose, CA (US); David Jauregui, Downey, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 11/069,362

(22) Filed: Mar. 1, 2005

(65) Prior Publication Data

US 2006/0197509 A1   Sep. 7, 2006

(51) Int. Cl.
 *G05F 1/00* (2006.01)
(52) U.S. Cl. ............... 323/222; 323/282; 323/284; 323/285
(58) Field of Classification Search ............ 323/222, 323/282, 284, 285, 223
See application file for complete search history.

(56) References Cited

U.S. PATENT DOCUMENTS

| | | | | |
|---|---|---|---|---|
| 5,477,132 A | * | 12/1995 | Canter et al. ............... 323/282 |
| 5,852,557 A | * | 12/1998 | Woodward ................... 363/124 |
| 5,912,552 A | * | 6/1999 | Tateishi ....................... 323/285 |
| 6,064,187 A | * | 5/2000 | Redl et al. .................. 323/285 |
| 6,144,194 A | * | 11/2000 | Varga .......................... 323/285 |
| 6,229,293 B1 | * | 5/2001 | Farrenkopf .................. 323/288 |
| 6,326,774 B1 | * | 12/2001 | Mueller et al. .............. 323/222 |
| 6,366,070 B1 | * | 4/2002 | Cooke et al. ................ 323/284 |
| 6,677,734 B2 | * | 1/2004 | Rothleitner et al. ........ 323/259 |
| 6,683,441 B2 | * | 1/2004 | Schiff et al. ................. 323/222 |
| 6,809,504 B2 | * | 10/2004 | Tang et al. .................. 323/274 |

* cited by examiner

*Primary Examiner*—Bao Q. Vu
(74) *Attorney, Agent, or Firm*—Dorsey & Whitney LLP

(57) ABSTRACT

An apparatus and method for regulating a voltage to a load to compensate for one or more parasitic impedances. A first amplifier measures the voltage drop due to a first parasitic impedance, and a second amplifier measures the voltage drop due to a second parasitic impedance. An offset generator sums the first and second voltage drops with a reference voltage, and drives a DC-to-DC converter to produce an input voltage matching the summed voltages. Accordingly, the voltage at a load between the parasitic impedances matches the reference voltage. The load may be, for example, a computer microprocessor or central processing unit.

33 Claims, 6 Drawing Sheets

METHOD AND APPARATUS FOR VOLTAGE COMPENSATION FOR PARASITIC IMPEDANCE

BACKGROUND OF THE INVENTION

1. Technical Field

The present invention relates generally to a method and apparatus for voltage regulation, and more specifically to methods and apparatuses for regulating voltage in computer hardware to compensate for one or more parasitic impedances.

2. Background Art

Many electronics systems employ a DC-to-DC converter to change one voltage to another. Typically, the DC-to-DC converter acts on a supply voltage to produce an input voltage. The input voltage and supply voltages are both direct current (DC) voltages. For example, many computing applications employ a DC-to-DC converter to step down a high supply voltage to a desired input voltage, which is then used to power a microprocessor such as a central processing unit (CPU), microprocessing unit (MPU), application-specific integrated circuit (ASIC), and so forth (collectively, a "load").

Computer hardware is typically voltage intolerant. That is, computer hardware requires a relatively small input voltage to operate, which must be within a relatively constrained voltage range. Changes to the input voltage of 40 or more millivolts may cause erratic operation of the hardware or even hardware failure. Accordingly, the input voltage to the load must be carefully regulated.

Modern computer hardware is extremely complex and miniaturized. The dual trends of complexity and miniaturization also render computer hardware more vulnerable to parasitic impedances. For example, trace or pattern resistances, interference from adjacent hardware, trace or pattern inductance, and dielectric capacitances may all result in a parasitic impedance affecting the operation of a load. Such impedances may occur inside the load itself, or on the board on which the load is formed or mounted.

Parasitic impedances generally drain a portion of the input voltage, lowering the input voltage seen and utilized by the load. Accordingly, the operation of the load may become unpredictable. The load may operate erratically or not at all, depending on the impedances and voltage tolerance of the load. Further, the parasitic impedances may vary with time, thus complicating regulation of voltage to the load.

Prior art voltage regulators, such as the implementation 100 shown in FIG. 1, employ a voltage sensing amplifier 120 to measure a voltage across the load 102. The output of the voltage sensing amplifier 120 is fed to a compensation amplifier 122, which compares the output to a reference voltage 124. The reference voltage 124 typically equals the desired input voltage for the load 102. Differences between the output of the voltage sensing amplifier 120 and reference voltage 124 cause the compensation amplifier to vary an input to the DC-to-DC converter 104 in order to adjust the input voltage provided by the converter.

However, and as shown in FIG. 1, this prior art implementation fails to account for the presence of parasitic impedances 112, 188. By driving the input voltage to match the reference voltage 124, the prior art regulator 100 ensures the voltage across the load 102 will never equal the reference voltage. The parasitic impedances 112, 118 operate to diminish the load voltage. Thus, the prior art voltage regulator 100 may not allow optimal operation (or operation at all) of the load 102.

Accordingly, an improved voltage regulator is needed.

SUMMARY OF THE INVENTION

One embodiment of the present invention takes the form of an apparatus and method for regulating a voltage to a load to compensate for one or more parasitic impedances. A first amplifier measures the voltage drop due to a first parasitic impedance, and a second amplifier measures the voltage drop due to a second parasitic impedance. An offset generator sums the first and second voltage drops with a reference voltage, and drives a DC-to-DC converter to produce an input voltage matching the summed voltages. Accordingly, the voltage at a load between the parasitic impedances matches the reference voltage. The load may be, for example, a computer microprocessor or central processing unit.

The embodiment may take the form of a circuit. The circuit may be implemented in any conventional manner, such as in an application-specific integrated circuit (ASIC), field-programmable gate array circuit (FPGA), other integrated circuit (including a very large scale integrated (VLSI), ultra-large scale integrated (ULSI), or wafer-scale integrated circuit), and so forth. The circuit may be integrated as part of a larger circuit or design, or may stand alone. For example, the voltage regulation circuit may be integrated into a computer motherboard or main logic board.

The voltage regulation circuit broadly operates by sensing an impedance parasitic to a system connected to the voltage regulation circuit, and adjusting the input voltage to the system. The input voltage is adjusted by an amount sufficient to offset the voltage drops caused by the parasitic impedances, which in turn ensures the proper input voltage is supplied to the system.

The voltage regulation circuit may include: a first amplifier having a first input electrically connected to a first node, a second input electrically connected to a third node, and a first output; a second amplifier having a first input electrically connected to a fourth node, a second input electrically connected to a second node, and a second output; an offset generator having a first input electrically connected to the first output from the first amplifier, a second input electrically connected to the second output from the second amplifier, a third input electrically connected to a reference voltage, and an offset output associated with an offset reference voltage and connected to an offset output node; and a compensation amplifier having a first input electrically connected to the first node, and a second input electrically connected to the offset output node. The compensation amplifier operates to drive a voltage at the first node to match the offset reference voltage. This, in turn, permits a voltage across the load to equal the reference voltage by compensating for the voltage loss due to any parasitic impedances.

Another embodiment of the present invention takes the form of a method for detecting and compensating for parasitic impedances in a circuit, including the operations of measuring a first voltage between a first node and a second node; measuring a second voltage between a third node and a fourth node; determining a first voltage loss from a first parasitic impedance between the first node and third node; determining a second voltage loss from a second parasitic impedance between the second node and fourth node; and adjusting the first voltage to compensate for the first and second voltage losses. The parasitic impedances generally cause the first and second voltage losses. This method provides a voltage to a load connected between the third and fourth nodes equal to a reference voltage.

The advantages of the present invention will be apparent to those of ordinary skill in the art upon reading the following detailed description of the invention.

DETAILED DESCRIPTION OF THE INVENTION

Generally, one embodiment of the present invention takes the form of an apparatus for regulating voltage. The voltage regulation may be performed, for example, by a circuit. The circuit may be implemented in any conventional manner, such as in an application-specific integrated circuit (ASIC), field-programmable gate array circuit (FPGA), integrated circuit (including a very large scale integrated (VLSI), ultra-large scale integrated (ULSI), or wafer-scale integrated circuit), and so forth. The circuit may be integrated as part of a larger circuit or design, or may stand alone. For example, the voltage regulation circuit may be integrated into a computer motherboard or main logic board.

The voltage regulation circuit broadly operates by sensing an impedance parasitic to a system connected to the voltage regulation circuit, and adjusting the input voltage to the system. The input voltage is adjusted by an amount sufficient to offset the voltage drops caused by the parasitic impedances, which in turn ensures the proper input voltage is supplied to the system.

It should be noted that the embodiments of the invention discussed herein work equally well when a single parasitic impedance is present within the system, even though reference is generally made in the plural to such impedances. Accordingly, where appropriate, reference to the plural should be construed to include the singular.

Figure 1:
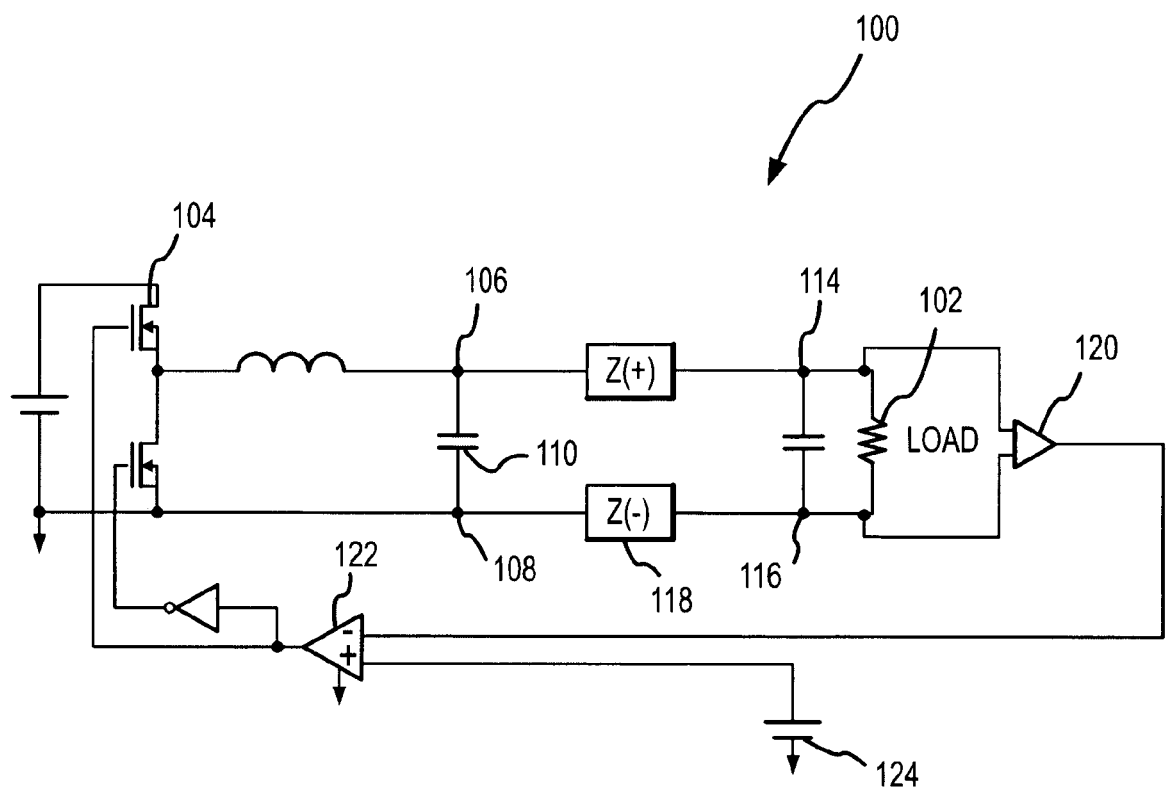
FIG. 1 depicts a prior art voltage regulation circuit.
Figure 2:
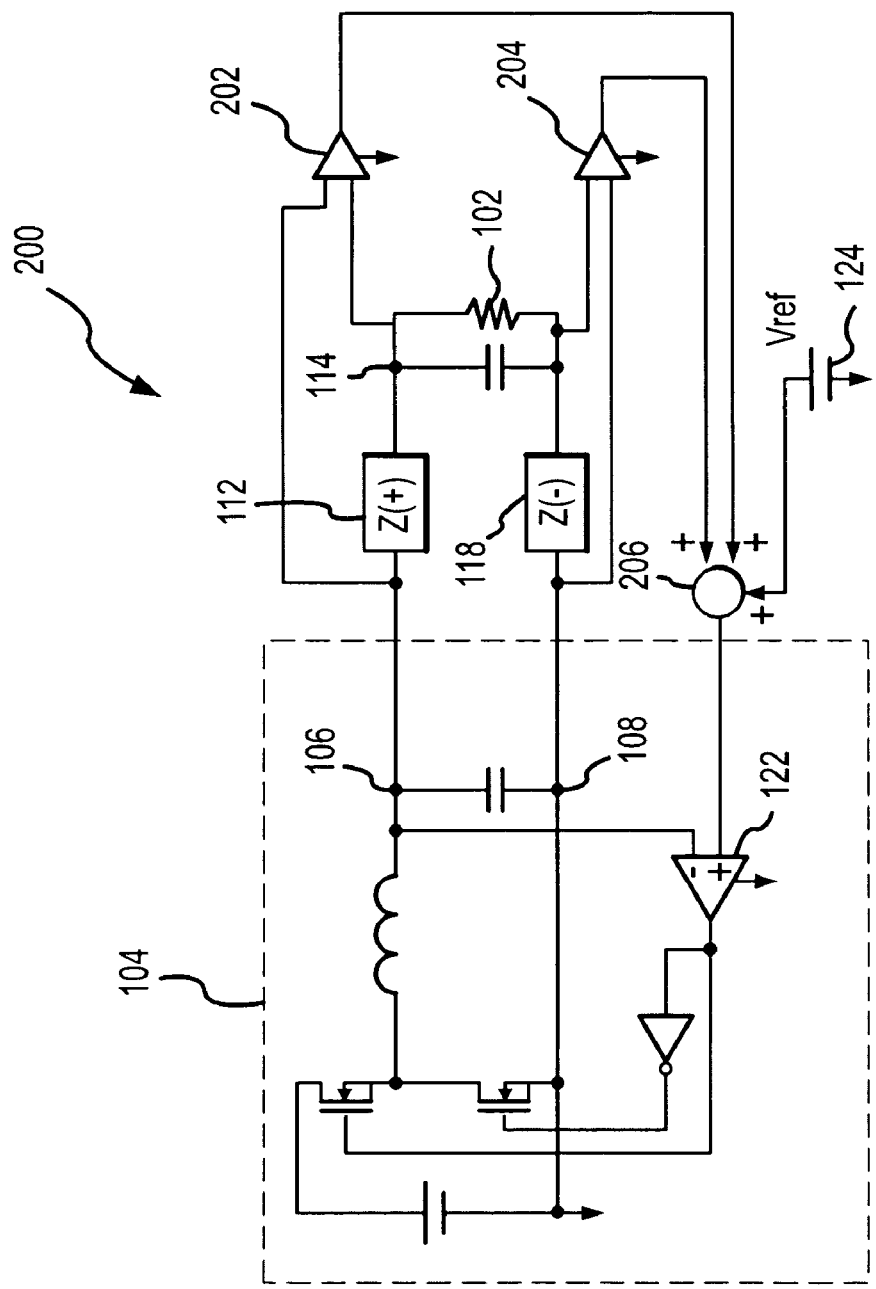
FIG. 2 depicts a schematic of a first embodiment of a circuit for detecting and offsetting voltages due to parasitic impedances.

Additional detail regarding the present embodiment of the invention is now supplied with respect to FIGS. 1 and 2. FIG. 1 depicts a typical prior art voltage compensation circuit. The load typically is supplied with a direct current (DC) voltage, referred to as the "input voltage," constrained within a voltage tolerance. Although one embodiment of the present invention is configured to operate with an input voltage of 1.5 volts, plus or minus 40 millivolts, alternate embodiments may operate with any input voltage or voltage tolerance.

The input voltage is supplied by a DC-to-DC converter 104, which steps down an outside voltage produce an initial voltage. Generally, the initial voltage matches the desired input voltage for the load 102. The DC-to-DC converter operates in a manner well known to those skilled in the art, and accordingly is not described in detail herein. In short, the voltage is established between a first node 106 and second node 108, separated by a reference or decoupling capacitor 110.

Electrically connected to the first node 106 is a first parasitic impedance 112. Current flows from the first node 106 through the first parasitic impedance 112 and to a third node 114 electrically connected to the load 102. It should be noted the voltage at the first node 106 and input to the parasitic impedance 112 is identical, as is the voltage at the third node 114 and input to the load 102. Because current flows through the first impedance 112, the input voltage drops from the first node 106 to the third node 114. Accordingly, voltage at the input to the load 102 is less than the input voltage supplied by the DC-to-DC converter 104.

Similarly, the load 102 establishes a potential difference as current flows therethrough from the third node 114 to a fourth node 116. However, because a second parasitic impedance 118 is between the fourth node 116 and the second node 108, the voltage at the load output (fourth node) is not at ground. Thus, although the voltage between the first node 106 and second node 108 equals the desired input voltage for the load 102, the voltage between the load input and output (i.e., third node 114 and fourth node 116) may be substantially different. Effectively, the first parasitic impedance 112 lowers the voltage seen at the load input, while the second parasitic impedance 118 raises the voltage seen at the load output. Accordingly, the voltage across the node is diminished.

The voltage compensation circuit 100 attempts to regulate voltage at the load input 114 by sensing the voltage drop across the load 102. The circuit 100 employs a voltage sensing amplifier 120 for this purpose; the voltage sensing amplifier 120 is connected to the third node 114 and fourth node 116 for this purpose. An output of the voltage sensing amplifier 120 feeds a first input of a compensation amplifier 122. The compensation amplifier 122 has a second input tied to a reference voltage 124. The reference voltage 124 equals the desired input voltage.

Accordingly, the compensation amplifier 122 may adjust the operation of the DC-to-DC converter 104, based on the difference between the output voltage of the sensing amplifier 120 and the reference voltage 124. The compensation amplifier's 122 input to the converter 104 changes the input voltage (i.e., the voltage measured between the second node 106 and third node 108), with the aim of making the voltage across the capacitor 110 match the desired input voltage. However, because the voltage sensing amplifier 120 is measuring a load voltage diminished by the first and second parasitic impedances 112, 118, the voltage across the reference capacitor 110 may not match the desired input voltage. Further, even in the event these values match, the voltage across the load 102 is less than the desired input voltage.

These differences in voltage may place the input voltage at node 114, to the load 102, outside the voltage tolerance. This may, for example, result in diminished operation of the load 102 or complete inoperability of the load. Further, because the compensation amplifier 122 continually modifies the DC-to-DC converter 104 to obtain the desired input voltage, the current loop between converter 104, load 102, and amplifier 122 may become unstable and yield unpredictable results.

FIG. 2 depicts a high-level schematic of a first embodiment of the invention, namely a voltage regulation circuit 200, affixed to the system or load 102. The present voltage regulation circuit 200 operates to stabilize the input voltage to the load 102 at the desired value.

The voltage regulation circuit 200 includes a first amplifier 202 and second amplifier 204, each of which produce an input for an offset generator 206. The operation of the amplifiers 202, 204 and generator 206 will be discussed in turn.

The first amplifier 202 has two inputs. The first input is connected to the first node 106 and the second input to the third node 114. Thus, the voltage difference between the first input and second input of the first amplifier 202 is the voltage drop across the first parasitic impedance 112. Accordingly, the first amplifier 202 outputs a voltage signal equal to this voltage drop.

Similarly, the second amplifier 204 has a first input connected to the fourth node 116 and a second input connected to the second node 108. The voltage differential between the first and second inputs of the second amplifier 204 equals the voltage drop across the second parasitic impedance 118. Accordingly, the output of the second voltage amplifier 204 equals the voltage loss due to the second parasitic impedance.

The offset generator 206 sums the outputs of the first and second amplifiers 202, 204, as well as the reference voltage 124. The output of the offset generator 206 equals this sum, and is fed as an input to the compensation amplifier 122. In place of the reference voltage input, as per the prior art configuration of FIG. 1, the compensation amplifier 122 accordingly is fed an input of the sum of the reference voltage and the voltage loss due to the first and second parasitic impedances 112, 118. Since this summed voltage replaces the reference voltage, the compensation amplifier 122 adjusts the DC-to-DC converter 104 to provide a higher initial voltage. In the embodiment of FIG. 2, the initial voltage (that is, the voltage across the reference capacitor 110) is set to equal the summed voltage. Thus, initial voltage at the first node 106 may be expressed as follows:

$$V_1 = V_I + V_{P1} + V_{P2};$$

where $V_1$ is the voltage at the first node;

$V_I$ is the input voltage desired for the load;

$V_{P1}$ is the voltage across the first impedance 112; and $V_{P2}$ is the voltage across the second impedance 118.

The voltage measured at the third node 114 is then:

$$V_3 = V_1 - V_{P1} = V_I + V_{P2};$$

where $V_3$ is the voltage at the third node.

Since the relative voltage at the second node 108 is zero and current flows from the fourth node 116 to the second node, the voltage $V_4$ at the fourth node must equal the voltage drop $V_{P2}$ across the second parasitic impedance 118. This is so because the second parasitic impedance 118 is the sole resistive element between the second and fourth nodes.

Thus, the voltage at the input of the load 102 is $V_I + V_{P2}$, while the voltage at the load output node 116 is $V_{P2}$. The load voltage must equal the difference between input and output voltages, which is the desired input voltage $V_I$. In this manner, the present embodiment 200 may supply a load 102 with a voltage equal to a desired input voltage (or at least within a desired voltage tolerance of the input voltage), regardless of any parasitic impedances experienced by the system.

Figure 3:
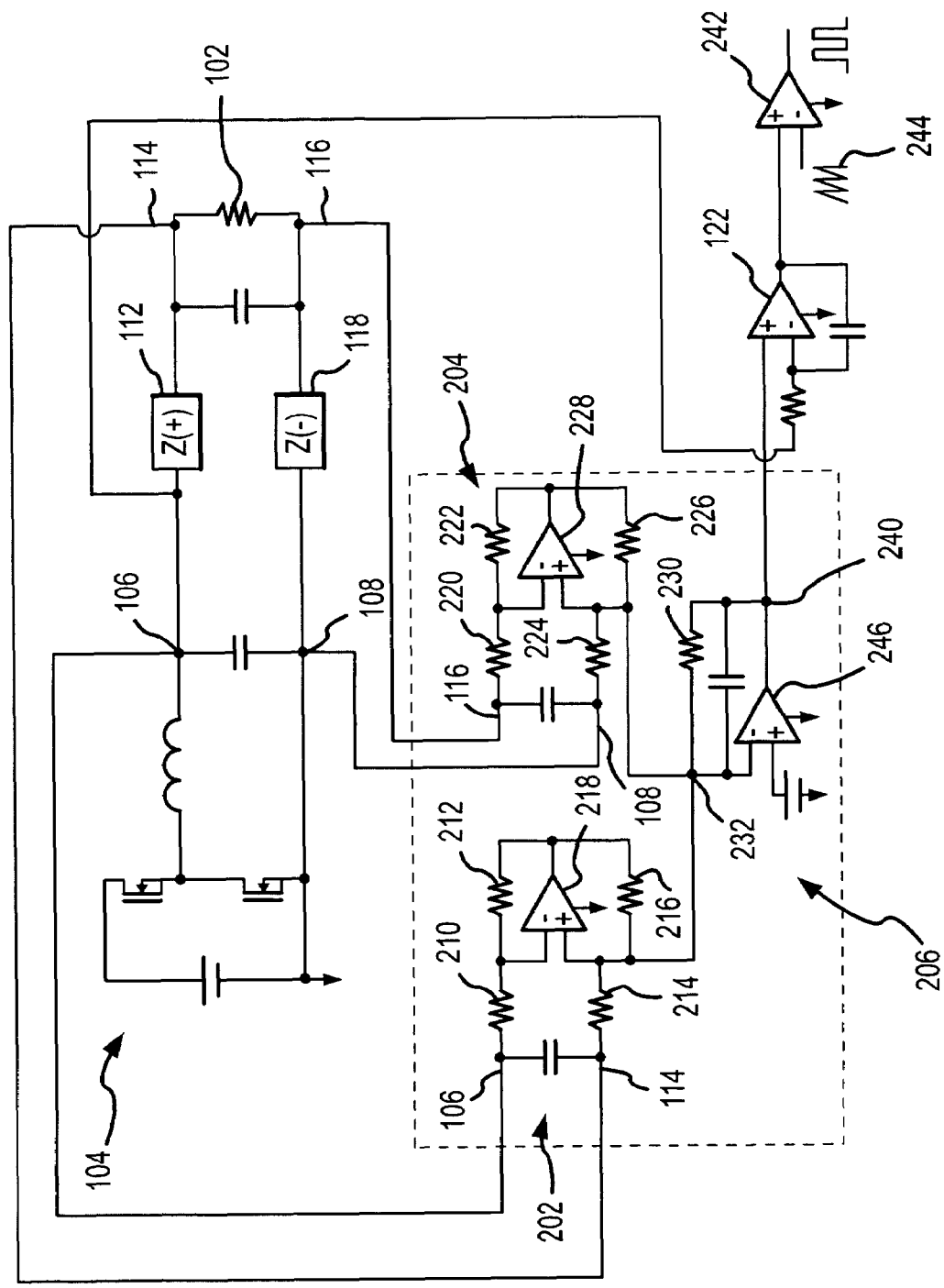
FIG. 3 depicts a more detailed schematic of the embodiment of FIG. 2.

FIG. 3 depicts a more detailed schematic of the embodiment of FIG. 2. Specifically, FIG. 3 depicts the circuitry employed to construct the first amplifier 202, second amplifier 204, and offset generator 206. The first amplifier 202, for example, consists of a first resistor 210 electrically connected to the first node 106 and a first amplifier node 227, a second resistor 212 electrically tied to the first amplifier node 227 and a second amplifier node 230, a third amplifier resistor 214 in electrical contact with the third node 114 and a third amplifier node 232, a fourth resistor electrically connected between the third amplifier node 232 and the second amplifier node 230, and a first error amplifier 218. The first error amplifier has a non-inverting input connected to the third amplifier node 232, an inverting input connected to the first amplifier node 227, and an output tied to the second amplifier node 230. A first filter capacitor 234 is optionally connected between the first node 106 and third node 114, and is generally used to filter noise picked up by traces. The circuit diagram for the first amplifier is shown to better effect in FIG. 4.

Figure 5:
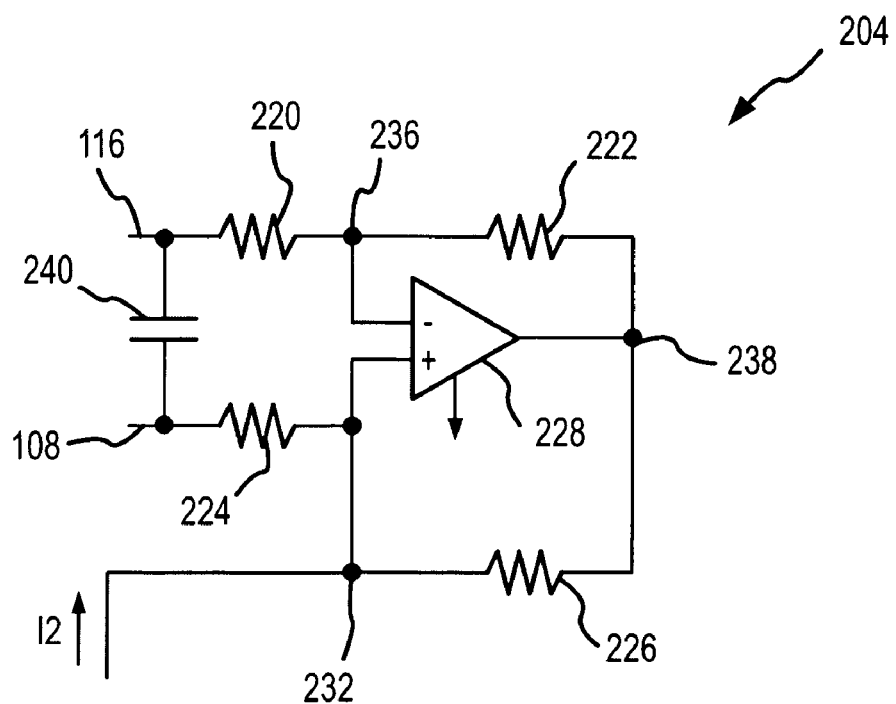
FIG. 5 depicts a schematic of a second current source, in accordance with the embodiment of FIG. 2.

With respect to FIGS. 3 and 5, the second amplifier 204's circuitry is also depicted. The second amplifier 204 includes a fifth resistor 220, sixth resistor 222, seventh resistor 224, eighth resistor 226, and second error amplifier 228. An optional second filter capacitor 240 may also be included in the second amplifier 204. The fifth resistor 220 is electrically connected to the fourth node 116 and a fourth amplifier node 236. The sixth resistor 222 is electrically connected to the fourth amplifier node 236 and a fifth amplifier node 238. A seventh resistor 224 connects the second node 108 to the third amplifier node 232. A second error amplifier 228 has an inverting input electrically connected to the fourth amplifier node 236, a non-inverting input connected to the third amplifier node 232, and an output connected to the fifth amplifier node 238. A second filter capacitor 240 may optionally be connected between the second node 108 and fourth node 116.

The first and second amplifiers 202, 204 (i.e., their component circuitry) operate as current sources. The first amplifier 202 operates to source and/or sink current proportional to the voltage across the first parasitic impedance 112, while the second amplifier 204 operates to the source and/or sink current proportional to the voltage across the second parasitic impedance 118. Since the first and second amplifiers 202, 204 share a common node 232 with the offset generator 206, current changes in the amplifiers affect the current flowing through the offset generator 206. The detailed operation of the first and second amplifiers 202, 204, as well as that of the offset generator 206, is detailed below.

At a broad level, the offset generator 206, through operation of the component offset amplifier 246, sums the current from each of the first and second amplifiers 202, 204 and converts the summed current to an offset voltage. The offset generator 206 adds the offset voltage to the reference voltage, producing an offset reference voltage, which is then inputted to the compensation amplifier 122 in lieu of the reference voltage. The compensation amplifier 122 compares the offset reference voltage to the feedback voltage from the DC-to-DC converter 104, and may adjust the input to the DC-to-DC converter accordingly in order to vary the initial voltage produced.

A comparator 242 may also be employed by the present embodiment 200. The comparator 242 accepts the output from the compensation amplifier 122, and compared to an exemplary ramp signal 244. The comparator may generate a pulse-width modulated output signal from the comparator output and the ramp signal. The pulse-width modulated output may minimize excessive switching of the initial voltage, and thus switching of the load 102, by regulating the input to the DC-to-DC converter 104.

Since the offset generator 206 operates to sum the current from both the first and second amplifiers 202, 204, the current flow through each amplifier is discussed in turn.

Figure 4:
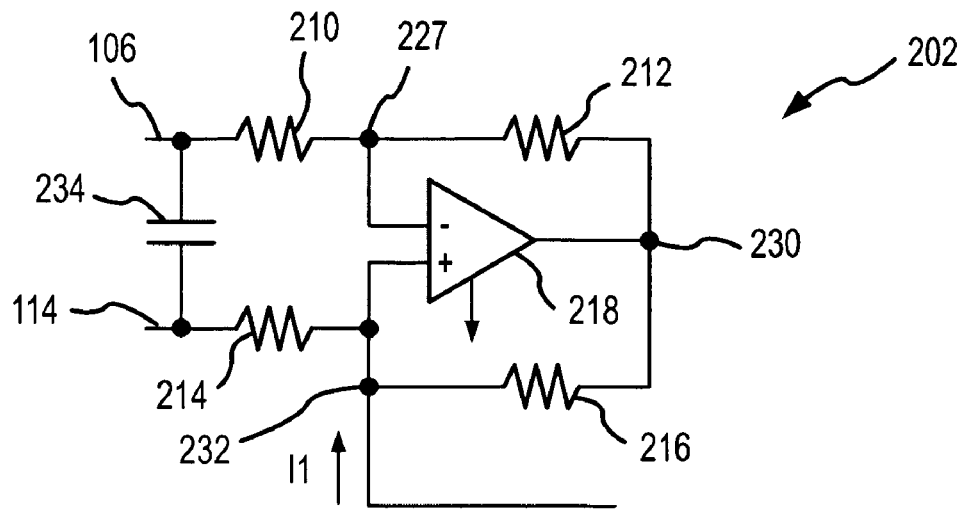
FIG. 4 depicts a schematic of a first current source, in accordance with the embodiment of FIG. 2.

Turning now to FIG. 4, the detailed operation of the first amplifier 202 will be discussed first. As shown in FIG. 4, a current I1 flows into node 232. Further, the following general operating conditions apply to the circuitry of the first amplifier during normal operation. First, the input impedance of the first error amplifier 218 is extremely high, resulting in an open-loop gain (in other words, the amplifier 218 is effectively ideal). Second, the circuitry of the first amplifier operates in a continuous steady state. Third, and finally, the inverting and non-inverting inputs of the first error amplifier 218 have the same voltage potential during steady-state operation.

The current I1 at the non-inverting input of the first error amplifier may be expressed as the sum of the current passing through the third and fourth resistors 214, 216. Accordingly,:

$$I1=[(V_{A3}-V_3)/R3]+[(V_{A3}-V_{A2})/R4];$$

where $V_{A3}$=the voltage at the third amplifier node 232;
$V_3$=the voltage at the third node 114;
$V_{A2}$=the voltage at the second amplifier node 230;
R3=the resistance of the third resistor 214; and
R4=the resistance of the fourth resistor 216.

Further, the voltage potential of the non-inverting input of the first error amplifier 218 may be expressed as:

$$V_{A1}=[(R1*V_{A2})+(R2*V_1)]/(R1+R2);$$

where $V_{A1}$=the voltage at the third amplifier node 232;
R1=the resistance of the first resistor 210;
R2=the resistance of the second resistor 212;
$V_{A2}$=the voltage at the second amplifier node 230; and
$V_1$=the voltage at the first node 106.

As previously mentioned, the voltage at each input of the first error amplifier 218 is equal. Further, in the present embodiment, the first resistor 210 and second resistor 212 have equal resistance, and the third and fourth resistors 214, 216 also have equal resistance. Accordingly, the current I1 at the non-inverting input of the first error amplifier 218 (and thus from the third amplifier node 232) may be shown as follows:

$$I1=(V_1-V_3)/R3.$$

Thus, once the resistors 210, 212, 214, 216 are appropriately matched, the current to the non-inverting input of the first error amplifier 218 is a function of the voltage across the first parasitic impedance 112.

The operation of the second amplifier 204 is similar to that immediately described. The second amplifier 204 also draws a current, in this case current I2 through the non-inverting input of the second error amplifier 228. The same three operating conditions apply to the circuitry of the second amplifier as were discussed with respect to the first amplifier 202. The current I2 may be expressed as:

$$I2=[(V_{A3}-V_2)/R7]+[(V_{A3}-V_{A5})/R8];$$

where $V_{A3}$=the voltage at the third amplifier node 232;
$V_2$=the voltage at the second node 108;
R7=the resistance of the seventh resistor 224;
$V_{A5}$=the voltage at the fifth amplifier node 238; and R8=the resistance of the eighth resistor 226.

Further, because both current I2 and I1 are tied together at the third amplifier node 232, the voltage of the non-inverting input of the second error amplifier 228 is the same as that of the non-inverting input of the first error amplifier 218. The voltage potential at the second error amplifier's inverting input, however, is as follows:

$$V_{A4}=[(R5*V_{A5})+(R6*V_4)]/(R5+R6);$$

where $V_{A4}$=the voltage at the fourth amplifier node 236;
R5=the resistance of the fifth resistor 220;
$V_{A5}$=the voltage at the fifth amplifier node 238;
R6=the resistance of the sixth resistor 222; and
$V_4$=the voltage at the fourth node 116.

Further, given the aforementioned operating conditions, the voltage at the non-inverting input of the second error amplifier 228 equals the voltage of the inverting input.

In the present embodiment, groups of resistors are matched to adjust the current flow I2. For example the fifth and sixth resistors 220, 222 are matched, as are the seventh resistor 224 and eighth resistor 226. When the resistors are matched in the aforementioned pairs, the current I2 equals $(V_4-V_2)/R7$. In other words, the current is the voltage difference between the fourth node 116 and second node 108, divided by the resistance value of the seventh resistor 224. It should be noted that the voltage difference between the fourth node and second node equals the voltage drop across the second parasitic impedance 118, as shown to best effect in FIG. 2. Accordingly, the current I2 seen by the second error amplifier 228 is proportional to the voltage loss due to the second parasitic impedance.

Figure 6:
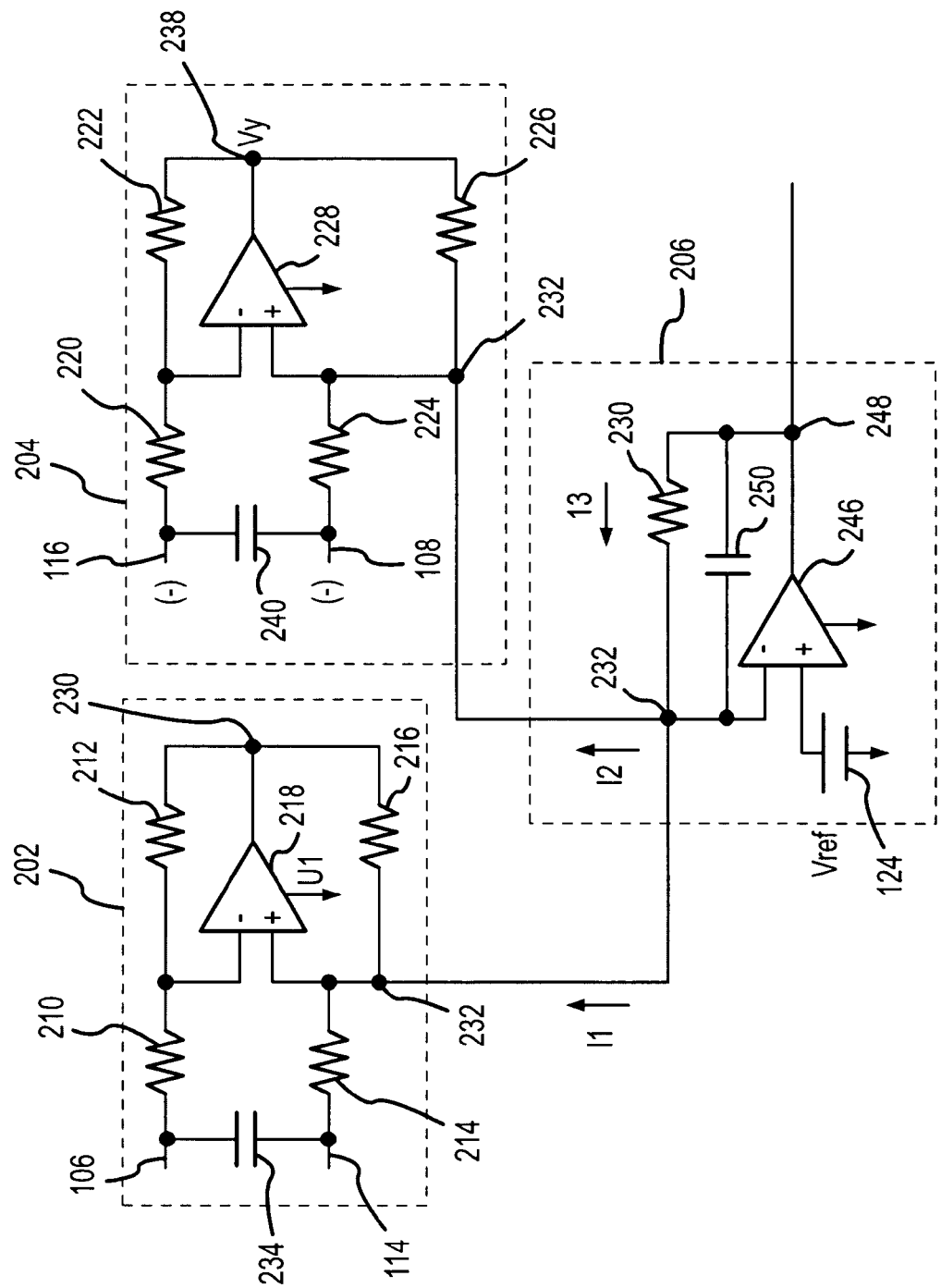
FIG. 6 depicts a partial circuit of the embodiment of FIG. 2, depicting the behavior of the partial circuit.

FIG. 6 depicts the amplifiers 202 and 204 electrically connected to the offset generator 206. The view of FIG. 6 is an expanded view of the circuitry in the dashed box of FIG. 3. It can be seen that the amplifiers 202, 204 and the offset generator 206 are connected at, and share, the third amplifier node 232 (the "shared node"). A current flows through the ninth resistor 230 from an output node 248 of the offset generator 206, and into the shared node 232. In FIG. 6, this current is labeled "I3." The shared node 232 supplies currents I1 and I2 to the non-inverting inputs of the first and second error amplifiers 218, 228, respectively. Further, when the embodiment 200 operates in a steady state, no current flows through the offset capacitor 250. Accordingly, in a steady state current I3 must equal the sum of current I1 and current I2.

Additionally, shared node 232 is connected to the inverting input of the offset amplifier 246. As with the first and second error amplifiers 218, 228, the voltage at the inverting and non-inverting inputs of the offset amplifier 246 are effectively equal. As shown in FIG. 6, the non-inverting terminal of the offset amplifier is connected to the reference voltage 124. Accordingly, the voltage at the shared node 232 equals the reference voltage 124.

The offset reference voltage (i.e., the voltage at the output node 248) equals the voltage at the shared node 232, plus the product of the current I3 and the resistance of the ninth resistor 230. Mathematically expressed, $$V_{OR}=V_{A3}+(I3*R9);$$

where $V_{OR}$=the offset reference voltage at output node 248;
$V_{A3}$=the voltage at the shared node 232 (or the third amplifier node); and
R9=the resistance of the ninth resistor 230.

In the present embodiment, the resistance of the third resistor 214, seventh resistor 224, and ninth resistor 230 are matched. Bearing in mind that the current I3 equals the sum of currents I1 and I2, the offset reference voltage may be expressed as:

$$V_{OR}=R9*\{[(V_4-V_2)/R7]+[(V_1-V_3)/R3]\}+V_{A3};$$

which equates to $$V_{OR}=R9*\{[(V_4-V_2)/R9]+[(V_1-V_3)/R9]+V_{A3};$$

or $$V_{OR}=(V_4-V_2)+(V_1-V_3)+V_{A3}.$$

All variable definitions remain as previously stated herein. Further, since the voltage at the shared node 232 equals the reference voltage 124, the offset reference voltage at the output node 248 is the sum of the reference voltage ($V_{A3}$), the voltage across the first parasitic impedance 112 ($V_1-V_3$), and the voltage across the second parasitic impedance 118 ($V_4-V_2$).

Returning briefly to FIGS. 2 and 3, the inverting input of the compensation amplifier 122 is electrically connected to the first node 106, and the non-inverting input thereof is tied to the output node 240. In the present embodiment 200, the compensation amplifier 122 is an open-loop amplifier, and during steady-state operation its inputs have identical voltage. To maintain the identical voltage, the compensation amplifier output drives the transistors of the DC-to-DC converter 104 to switch as necessary. In the present embodiment 200, however, the inputs of the compensation amplifier both have a potential equal to the offset reference voltage. Thus, the voltage at the first node 106 is also the offset reference voltage.

The voltage ultimately seen at the input of the load 102 is the offset reference voltage, less the voltage drop across the first parasitic impedance 112. Likewise, the voltage at the load output (i.e., fourth node 116) definitionally is the voltage lost to the second parasitic impedance 118. Accordingly, the voltage across the load 102 equals the desired reference voltage.

In this manner, the present embodiment 200 may provide the load 102 with a desired reference voltage, despite the presence of any parasitic impedances 112, 118 affecting the system.

It should be noted the ninth resistor 230 and offset capacitor 250 form a resistive-capacitive (RC) circuit, and may be used in tandem to set a time constant during which the offset amplifier 206 converts the current from the first and second amplifiers 202, 204 to voltages. Changing either the capacitive value of the offset capacitor 250 or the resistance of the ninth resistor 230 may adjust the time constant accordingly. In order to decrease the switching time of the present embodiment 200, the capacitance of the offset capacitor may be changed. Typically, the resistance of the ninth resistor is not changed, insofar as this resistor is matched to other electrical components of the present embodiment as discussed above. However, the resistance of the ninth resistor could conceivably be changed to alter the switching time of the embodiment 200 as well.

Figure 7:
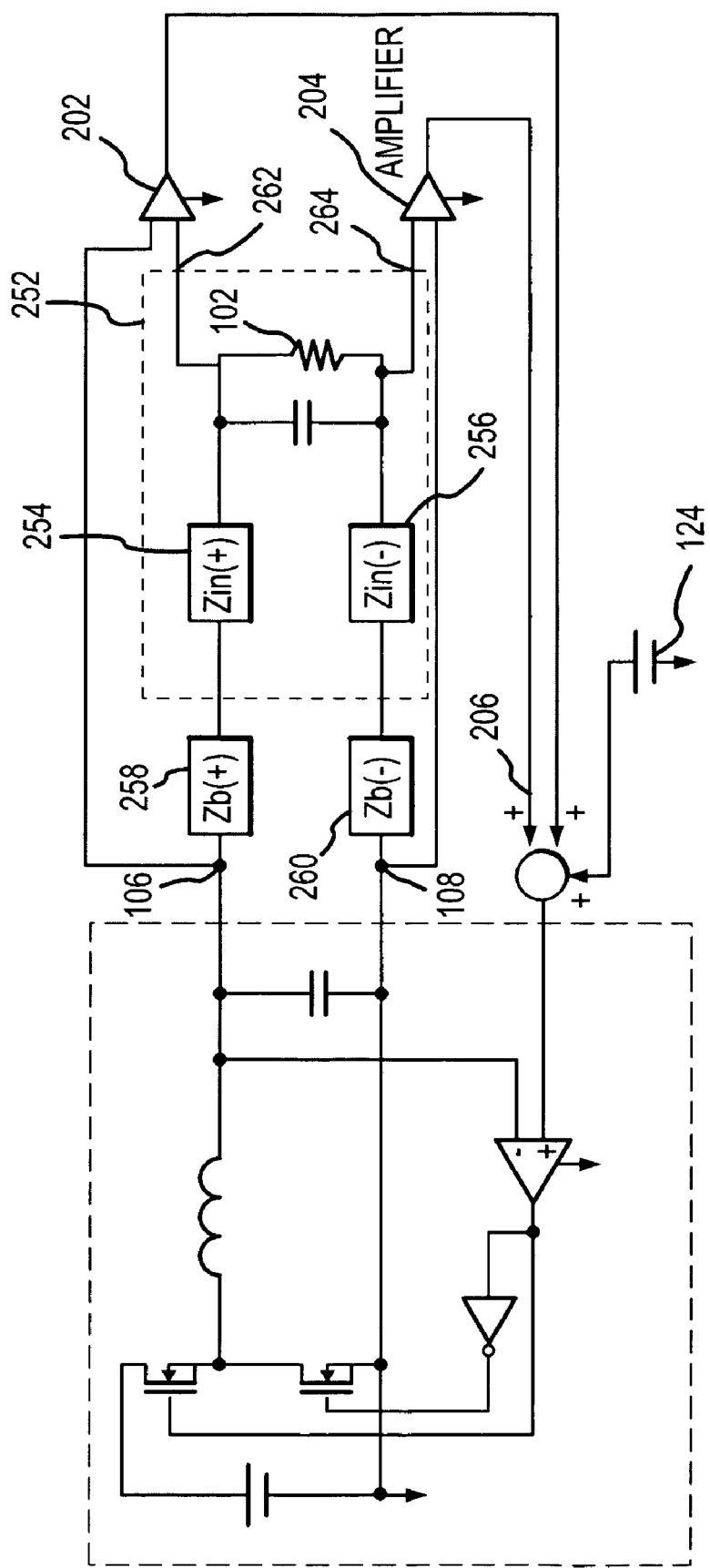
FIG. 7 depicts the circuit of FIG. 1, as applied in an exemplary environment.

FIG. 7 depicts the embodiment 200 of present invention, as applied to an exemplary application. Here, the load 102 takes the form of a computing element, such as a central processing unit (CPU), application-specific integrated circuit (ASIC), microprocessor, or other processor. For example, the load may be a graphics processor on a graphics card, a secondary processor, a digital signal processor, and so forth. Collectively, these elements will be defined by the term "computing element" or "load" with respect to FIG. 7.

FIG. 7 depicts an ASIC 252 as including not only the load 102, which is typically the aforementioned computing element to which a desired reference voltage 124 must be supplied, but also one or more intrinsic impedances 254, 256. In addition, the motherboard or other board on which the ASIC 252 is formed or seated may include external parasitic impedances 258, 260.

Typically, the ASIC 252 and its load 102 are formed on a die. The die generally has a first Kelvin point 262 tied to the load input, and a second Kelvin point 264 tied to the load output. These Kelvin points 262, 264 equate to the earlier-discussed third node 114 and fourth node 116. Accordingly, the first amplifier 202 is electrically attached to the first node 106 and the first Kelvin point 262 of the die, thus bridging both the first board impedance 258 and first intrinsic impedance 254. Similarly, the second amplifier 204 is electrically connected to the second node 108 and second Kelvin point 264, with the second board impedance 260 and second intrinsic impedance 236 in-line therebetween. It should be noted the first node 106 and second node 108 are not formed on the die.

Thus, each amplifier 202, 204 takes into account both board and ASIC impedances when producing a current fed to the offset generator 206 in the manner discussed above. The present embodiment 200 is therefore well-suited to compensate not only for voltage drops due to external impedances, but also due to any impedances within the ASIC 252, regardless of on which side of the load 102 the impedances occur. Exemplary impedances may include trace or pattern resistances, inductances, and dielectric capacitances. The present invention may account for any of these and nonetheless supply the desired reference voltage 124 to the load 102.

Voltage regulation schemes that do not measure voltage at the first and second nodes 106, 108 generally ignore the effects of impedances stemming from the board on which the ASIC 252 is formed or seated, and may result in the formation of a pole between the DC-to-DC converter and the load. This, in turn, causes erratic switching and may prevent the load 102 from operating properly. Further, because the values of parasitic impedances at either the board or ASIC level are difficult to measure, optimizing a conventional voltage regulation system is difficult. Accordingly, it is preferable to electrically connect an input of the first and second amplifiers 202, 204 outside the die. By connecting one input of each of the amplifiers 202, 204 to opposing ends of the decoupling capacitor 110, the input voltage supplied by the DC-to-DC converter 104 may be directly measured. Similarly, by connecting the other input of each of the amplifiers to opposing nodes 114, 116 of the load 102, the voltage drop across the load itself may be measured and accounted for. Thus, the input voltage supplied by the converter equals the desired offset reference voltage.

Alternative embodiments, however, may connect both inputs of each of the first and second amplifiers 202, 204 within the die. For example, the first amplifier 202 may be connected to the first Kelvin point 262 and a secondary die contact point 270, while the second amplifier 204 is connected to the second Kelvin point 264 and a tertiary die contact point 272. In such embodiments, a third amplifier may be connected to the first node 106 and the secondary die contact point 270. A fourth amplifier may then be connected to the third node 108 and the tertiary die contact point 272. The outputs of the third and fourth amplifiers may serve as additional inputs to the offset generator 206. Effectively, in such an alternative embodiment the first and second amplifiers are dedicated to compensating for impedances within the ASIC 252, and the third and fourth amplifiers compensate for impedances external to the ASIC 252.

Certain embodiments of the present invention may be programmable by a user to tune the circuit operation to a specific load 102. The user may, for example, vary the capacitance of the offset capacitor 250 in order to adjust the time constant and switching of the offset amplifier 240. In this manner, the present invention may regulate voltage to a variety of loads 102 in a variety of applications.

Although the present invention has been described with respect to particular embodiments and methods of operation, it should be understood such embodiments are exemplary rather than limiting. Alternate implementations of the invention will occur to those skilled in the art upon reading the disclosure. Accordingly, the proper scope of the present invention is defined by the appended claims.

We claim:

1. A voltage regulator, comprising:
   a first amplifier comprising:
      a first input electrically connected to a first node;
      a second input electrically connected to a third node;
      a first output;
   a second amplifier comprising:
      a first input electrically connected to a fourth node;
      a second input electrically connected to a second node;
      a second output;
   an offset generator comprising:
      a first input electrically connected to the first output from the first amplifier;
      a second input electrically connected to the second output from the second amplifier;
      a third input electrically connected to a reference voltage;
      an offset output associated with an offset reference voltage and connected to an offset output node;
   a compensation amplifier comprising:
      a first input electrically connected to the first node; and
      a second input electrically connected to the offset output node; wherein
   the compensation amplifier is operative to drive a voltage at the first node to match the offset reference voltage.

2. The voltage regulator of claim 1, further comprising a load electrically connected between the third node and the fourth node, the load chosen from the group comprising: a central processing unit, a microprocessing unit, and an application-specific integrated circuit.

3. The voltage regulator of claim 1, wherein a voltage between the third node and the fourth node matches the reference voltage.

4. The voltage regulator of claim 3, further comprising:
   a DC-to-DC converter, comprising:
   a first input electrically connected to a supply voltage;
   a second input electrically connected a compensation output of the compensation amplifier;
   the DC-to-DC converter operative to produce an input voltage measured between the first and second nodes;
   the input voltage varying directly with the offset reference voltage.

5. The voltage regulator of claim 3, the first amplifier comprising:
   a first resistor electrically connected between the first node and a first amplifier node;
   a second resistor electrically connected between the first amplifier node and a second amplifier node;
   a third resistor electrically connected between the third node and a shared amplifier node;
   a fourth resistor electrically connected between the second amplifier node and the shared amplifier node; and
   a first error amplifier electrically connected to the first amplifier node, the second amplifier node, and a the shared amplifier node.

6. The voltage regulator of claim 5, wherein:
   an inverting input of the first error amplifier is connected to the first amplifier node, the inverting input comprising the first input of the first amplifier;
   a non-inverting input of the first error amplifier is connected to the shared amplifier node, the non-inverting input comprising the second input of the first amplifier; and
   an output of the first error amplifier is connected to the second amplifier node.

7. The voltage regulator of claim 6, wherein the non-inverting input of the first error amplifier draws a first current through the shared amplifier node.

8. The voltage regulator of claim 7, wherein:
   the resistances of the first resistor and second resistor are equal; and
   the resistances of the third resistor and fourth resistor are equal.

9. The voltage regulator of claim 8, further comprising a first filter capacitor electrically connected between the first node and third node, the first filter capacitor operative to filter a first trace noise.

10. The voltage regulator of claim 8, the second amplifier comprising:
    a fifth resistor electrically connected between the fourth node and a fourth amplifier node;
    a sixth resistor electrically connected between the fourth amplifier node and a fifth amplifier node;
    a seventh resistor electrically connected between the second node and the shared amplifier node;
    a eighth resistor electrically connected between the fifth amplifier node and the shared amplifier node; and
    a first error amplifier electrically connected to the fourth amplifier node, the fifth amplifier node, and a the shared amplifier node.

11. The voltage regulator of claim 10, wherein:
    an inverting input of the second error amplifier is connected to the fourth amplifier node, the inverting input comprising the first input of the second amplifier;
    a non-inverting input of the second error amplifier is connected to the shared amplifier node, the non-inverting input comprising the second input of the second amplifier; and
    an output of the second error amplifier is connected to the fifth amplifier node.

12. The voltage regulator of claim 11, wherein the non-inverting input of the second error amplifier draws a second current through the shared amplifier node.

13. The voltage regulator of claim 12, wherein:
    the resistances of the fifth resistor and sixth resistor are equal; and
    the resistances of the seventh resistor and eighth resistor are equal.

14. The voltage regulator of claim 13, further comprising a second filter capacitor electrically connected between the second node and fourth node, the second filter capacitor operative to filter a second trace noise.

15. The voltage regulator of claim 13, the offset generator comprising:
- a ninth resistor electrically connected between the shared amplifier node and the offset output node;
- a time-constant capacitor electrically connected between the shared amplifier node and the offset output; and
- an offset amplifier, comprising:
  - a first input electrically connected to the shared amplifier node;
  - a second input electrically connected to a reference voltage; and
  - an output electrically connected to the offset output node.

16. The voltage regulator of claim 15, wherein:
- the offset amplifier's first input is an inverting input; and
- the offset amplifier's second input is a non-inverting input.

17. The voltage regulator of claim 15, wherein:
- the first amplifier and second amplifier act as a first and second current sink;
- the first current and second current are drawn through the ninth resistor; and
- the offset voltage varies with the first current and second current.

18. The voltage regulator of claim 15, wherein the offset amplifier is operative to convert the first current and second current to a voltage.

19. The voltage regulator of claim 18, wherein:
- the first current is proportional to a voltage loss from a first impedance electrically connected between the first node and third node; and
- the second current is proportional to a voltage loss from a second impedance electrically connected between the second node and fourth node.

20. The voltage regulator of claim 19, wherein the offset voltage equals the sum of the reference voltage, the voltage loss from the first impedance, and the voltage loss from the second impedance.

21. The voltage regulator of claim 20, further comprising:
- a load electrically connected between the third node and the fourth node, the load chosen from the group comprising: a central processing unit, a microprocessing unit, and an application-specific integrated circuit; wherein
- a voltage across the load equals the reference voltage.

22. The voltage regulator of claim 21, wherein:
- the first node and second node are external to a die associated with the load;
- the third node comprises a first Kelvin sense point associated with the die; and
- the fourth node comprises a second Kelvin sense point associated with the die.

23. A method for regulating a voltage, comprising the operations:
- measuring a first voltage between a first node and a second node;
- measuring a second voltage between a third node and a fourth node;
- determining a first voltage loss from a first parasitic impedance between the first node and third node;
- determining a second voltage loss from a second parasitic impedance between the second node and fourth node; and
- adjusting the first voltage to compensate for the first and second voltage losses.

24. The method of claim 23, further comprising:
determining a reference voltage; and
adjusting the second voltage to match the reference voltage.

25. The method of claim 24, wherein:
the second voltage is measured across a load electrically connected between the third node and fourth node; and
the load is chosen from the group comprising: a central processing unit, a microprocessing unit, and an application-specific integrated circuit.

26. The method of claim 25, wherein:
the operation of determining a first voltage loss from a first parasitic impedance between the first node and third node comprises generating a current proportional to the first voltage loss; and
the operation of determining a second voltage loss from a second parasitic impedance between the second node and fourth node comprises generating a current proportional to the second voltage loss.

27. The method of claim 26, wherein:
the operation of adjusting the first voltage to compensate for the first and second voltage losses comprises:
generating the first current and second current from a common node; and
generating an offset voltage proportionate to the sum of the first and second currents.

28. The method of claim 27, wherein the operation of generating an offset voltage proportionate to the sum of the first and second currents comprises converting the first and second currents to a voltage by means of an offset amplifier.

29. The method of claim 27, wherein the offset voltage equals the sum of the reference voltage, the first voltage loss, and the second voltage loss.

30. The method of claim 29, further comprising adjusting an input voltage by means of the offset voltage.

31. The method of claim 30, wherein the operation of measuring a first voltage between a first node and a second node comprises:
- defining the first node on a computer hardware element as a first hardware sense point;
- defining the second node on the computer hardware element as a second hardware sense point; and
- measuring the first voltage between the first and second computer hardware sense points.

32. The method of claim 31, wherein the computer hardware element is a motherboard.

33. The method of claim 32, wherein the operation of measuring a second voltage between a third node and a fourth node comprises:
- defining the third node as a first Kelvin sense point in a die, the first Kelvin sense point at a first end of the load;
- defining the fourth node as a second Kelvin sense point in the die, the second Kelvin sense point at a second end of the load; and
- measuring the voltage between the first Kelvin sense point and second Kelvin sense point.

* * * * *